US005948259A

United States Patent [19]

Deguitre et al.

[11] Patent Number: 5,948,259

[45] Date of Patent: Sep. 7, 1999

[54] PROCESS AND APPARATUS FOR TREATING OILS AND SOLVENTS CONTAMINATED BY RADIOACTIVE SUBSTANCES

[75] Inventors: Joanes Deguitre, Sainte Colombe les Vienne; Maurice Stingre, Saint Julien de Peyrolas, both of France

[73] Assignee: Richmond Agency Limited, Dublin, Ireland

[21] Appl. No.: 08/875,792

[22] PCT Filed: Feb. 12, 1996

[86] PCT No.: PCT/FR96/00225

§ 371 Date: Aug. 4, 1997

§ 102(e) Date: Aug. 4, 1997

[87] PCT Pub. No.: WO96/24937

PCT Pub. Date: Aug. 15, 1996

[30] Foreign Application Priority Data

Feb. 10, 1995 [FR] France .................................. 95 01581

[51] Int. Cl.[6] ...................................................... C02F 11/02

[52] U.S. Cl. .......................... 210/602; 210/615; 210/631; 210/682; 210/688; 210/723; 210/805; 210/195.1; 210/199; 210/206; 210/912; 423/2; 588/20

[58] Field of Search .................................... 210/602, 615, 210/631, 682, 688, 723, 805, 195.1, 199, 205, 206, 911, 912; 423/2; 588/20

[56] References Cited

U.S. PATENT DOCUMENTS

| | | | |
|---|---|---|---|
| 3,899,376 | 8/1975 | Azarowicz | 210/922 |
| 4,569,787 | 2/1986 | Horiuchi et al. | 252/632 |
| 4,800,024 | 1/1989 | Elfline | 210/912 |
| 5,128,262 | 7/1992 | Lindoerfer et al. | 435/264 |
| 5,196,113 | 3/1993 | Metz | 210/205 |
| 5,403,809 | 4/1995 | Miller et al. | 502/413 |
| 5,494,580 | 2/1996 | Baskys et al. | 210/922 |

FOREIGN PATENT DOCUMENTS

| | | |
|---|---|---|
| 0 310 005 | 4/1989 | European Pat. Off. . |
| 0 370 409 | 5/1990 | European Pat. Off. . |
| 2 694 441 | 2/1994 | France . |
| 36 32 337 | 3/1988 | Germany . |
| 89 06992 | 8/1989 | WIPO . |

*Primary Examiner*—Jay H. Woo
*Assistant Examiner*—Betsey J. Morrison
*Attorney, Agent, or Firm*—Stroock & Stroock & Lavan

[57] ABSTRACT

A process for treating oils and solvents contaminated by radioactive substances includes a step of subjecting the oils and solvents to the action of pre-selected micro-organisms in the presence of air and a very large volume of water, relative to the volume of oils and solvents to be treated. The micro-organisms destroy organic molecules, and in particular transform them into $CO_2$ and $H_2O$. Further steps of the process include preparing a predetermined volume of water having predetermined characteristics of dissolved oxygen concentration, pH and redox potential and adding a predetermined charge of oils and solvents contaminated by radioactive substances to this volume of water, the charge corresponding to a volume of oils and solvents which is a predetermined fraction of the predetermined volume of water. The charge is subjected to the action of micro-organisms at a predetermined temperature and for a predetermined time period. At least a portion of the effluent obtained is removed and the water is separated from the substances contained in the effluent. The substances separated from the water are recycled or removed. The water from which the substances contained in the effluent have been removed is regenerated so that it regains the aforementioned predetermined characteristics. At least a portion of the regenerated water is recycled and the cycle is repeated from the step of preparing the predetermined volume of water.

17 Claims, 4 Drawing Sheets

PROCESS AND APPARATUS FOR TREATING OILS AND SOLVENTS CONTAMINATED BY RADIOACTIVE SUBSTANCES

BACKGROUND OF THE INVENTION

1. Field of the Invention

The invention concerns a process and apparatus for treating oils and solvents contaminated by radioactive substances.

2. Description of the Prior Art

Spent oils and solvents are treated by burning or by the action of pre-selected micro-organisms to decompose them into intermediate products and/or into simple substances, some of which naturally reform into $CO_2$ and $H_2O$.

In general, these micro-organisms react in the presence of a very large quantity of water and in the presence of oxygen, the ratio between the respective volumes of water and of oil being about 100/5 (20/1).

Thus for a "black tide", spreading micro-organisms over the surface of the sea covered with petroleum products to decompose those products is known in itself: the volume of water and the oxygen content of the water broadly comply with the above conditions.

Using water treatment plant to treat oily water containing much less than 5% by volume of oil using micro-organisms is also known in itself.

In those two cases and in numerous other cases known in themselves, the quantity of water relative to the volume of oils or solvents to be treated is so far in excess and any by-products of such a decomposition of oils and solvents are so diluted and eliminated as they are created that there is no concern about such by-products.

In contrast, oils and solvents which are contaminated with radioactive substances are subject to regulations which are becoming more and more strict and which proscribe contamination of the atmosphere or waste water removal systems to prevent dispersion into the environment of radioactive substances which such oils and solvents contain.

Thus nuclear power stations in France and in other countries are storing increasing volumes of contaminated oils and solvents which have to be stored until a solution is found which satisfies the regulations currently in force for their treatment.

The aim of the present invention is to overcome the disadvantages of known processes and apparatus and to provide a process and an apparatus for treating oils and solvents which are contaminated with radioactive substances, the process and apparatus being adapted to allow discharge into the atmosphere or into collecting systems of air and water having characteristics which satisfy the requirements of the current regulations, the radioactive substances being collected in a very small volume of waste products which is easy to treat and store to prevent any contamination of the environment.

SUMMARY OF THE INVENTION

In accordance with a first aspect of the invention, a process for treating oils and solvents contaminated by radioactive substances includes a step of subjecting the oils and solvents to the action of pre-selected micro-organisms in the presence of air and a very large volume of water, relative to the volume of oils and solvents to be treated, the micro-organisms being adapted to destroy organic molecules, in particular to transform them into $CO_2$ and $H_2O$.

In accordance with the invention, this process further includes the following steps:

a) preparing a predetermined volume of water having predetermined characteristics of dissolved oxygen concentration, pH and redox potential;

b) adding a predetermined charge of oils and solvents contaminated by radioactive substances to this volume of water, the charge corresponding to a volume of oils and solvents which is a predetermined fraction of the predetermined volume of water;

c) subjecting the charge to the action of micro-organisms at a predetermined temperature and for a predetermined time period;

d) removing at least a portion of the effluent obtained;

e) separating the water from the substances contained in the effluent;

f) recycling or removing the substances which have been separated from the water;

g) regenerating the water from which the substances contained in the effluent have been removed, so that it regains the predetermined characteristics;

h) recycling at least a portion of the water;

i) repeating the cycle from step a).

While processes known in themselves can treat small quantities of non-radioactive oils and solvents in the presence of a large volume of water, the by-products of the treatment give no cause for concern, being in any case sufficiently dilute for the regulations to be satisfied, it is possible to recycle at least a portion of the water produced by decomposition of the oils and solvents provided that it is regenerated so that it continuously regains the conditions of step a).

Operating on a pilot scale, the present inventor has recognized how to tackle the increase in the concentration of treatment residues due to recycling the recovered effluents so as continuously to regain conditions close to-the starting conditions under which micro-organisms are known to be capable of degrading and decomposing the oils and solvents. It is thus possible to transform substantially all of the organic molecules into $CO_2$ and $H_2O$.

Under these conditions, the radioactive substances and other substances contained in the recovered effluent are separated from the water in step e) and recycled or treated in step f) to constitute only a small volume of residues which is much easier to treat and store than the initial volume of contaminated oils and solvents.

In one beneficial version of the invention, a predetermined volume of regenerated water substantially corresponding to the volume of a new charge of oils and solvents contaminated with radioactive substances is removed so that the operation can be properly monitored.

The volume of waste liquids resulting from carrying out the process of the present invention is thus substantially equal to the volume of oils and solvents degraded and these waste liquids completely satisfy the requirements of the current regulations.

In another beneficial version of the invention, pre-selected mineral supports are used for the micro-organisms to fix at least a portion of the metals present in the charge by ion exchange.

In an advantageous version of the invention, the effluent is clarified by decanting and the sludge obtained is recycled to step c).

In a preferred version of the invention, the water from the effluent is vacuum evaporated and step g) uses the recovered water after evaporation and condensation, recovering the residues from the vacuum evaporation operation and drying them in a fluidized bed.

In another aspect, the invention provides apparatus for carrying out the process of the invention which includes:

means forming a storage tank for receiving and containing a predetermined volume of water and a predetermined charge of oils and solvents contaminated by radioactive substances and means for injecting air into the means forming the storage tank;

means for removing and receiving at least a portion of the effluent obtained;

means for separating water from the substances contained in the effluent;

means for recycling or evacuating the substances contained in the effluent;

means for regenerating the water from which the substances contained in the effluent have been removed so that it regains the characteristics of the water used in step a) and for recycling a portion of the water.

Further details and advantages of the present invention will become apparent from the detailed description below.

BRIEF DESCRIPTION OF THE DRAWINGS

In the accompanying drawings, which are given solely by way of non-limiting example.

DETAILED DESCRIPTION OF THE PREFERRED EMBODIMENTS

Figure 1:
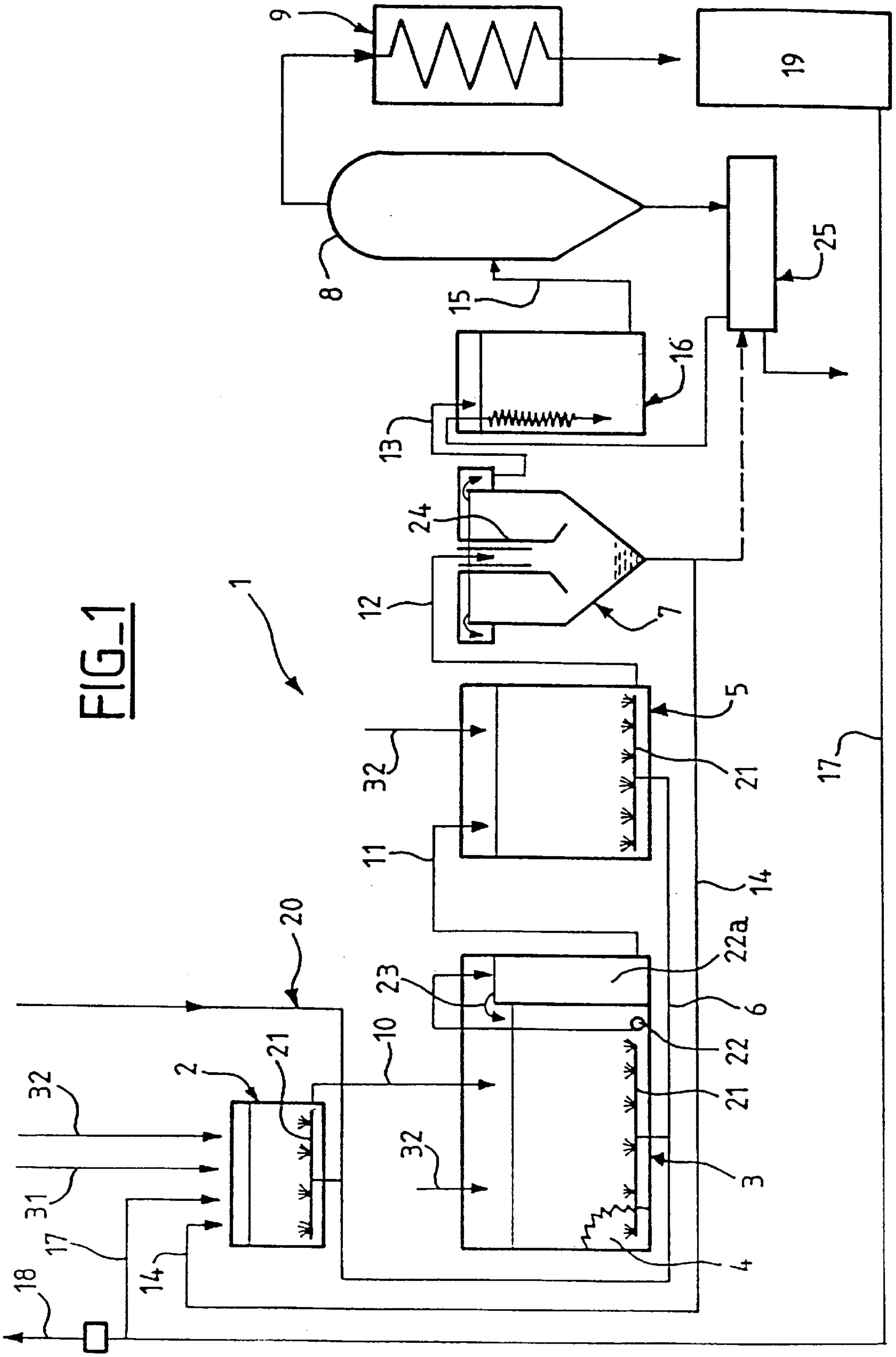
FIG. 1 is a functional schematic of one embodiment of apparatus in accordance with the present invention.
Figure 2:
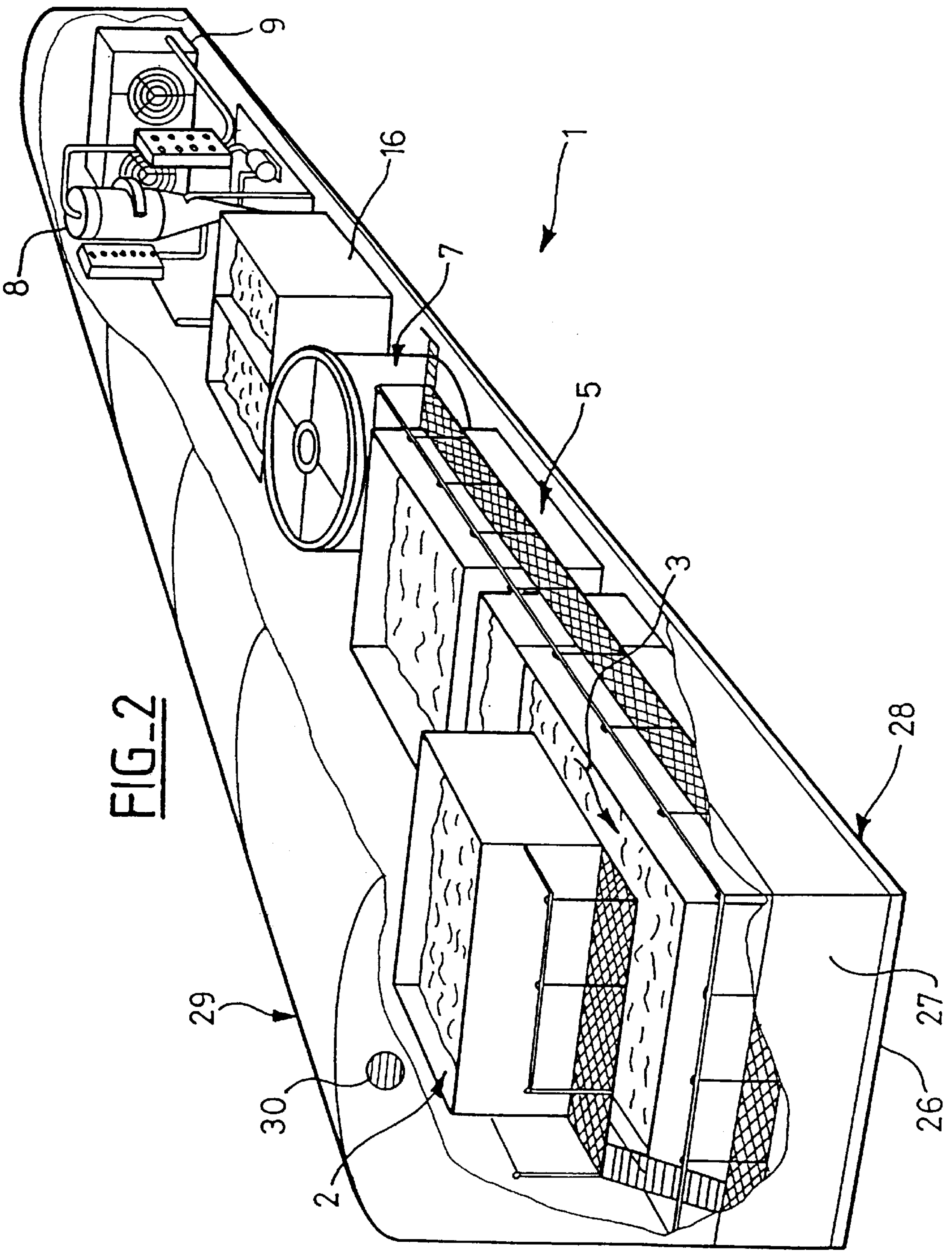
FIG. 2 is a perspective cutaway view of the apparatus shown in FIG. 1.

In the embodiment shown in FIGS. 1 and 2, apparatus 1 includes:

a premixer 2 adapted to receive a predetermined volume of water, a predetermined charge of contaminated oils and solvents and micro-organisms which will be specified below;

a first reactor 3 adapted to receive at least a portion of the mixture from premixer 2 and micro-organisms and mineral supports shown in schematic form at 4 and which will be specified below;

a second reactor 5 adapted to receive the mixture leaving the first reactor 3 and micro-organisms;

means shown in schematic form at 6 for injecting air into premixer 2 and into each of reactors 3 and 5;

a clarifier 7 for separating water from the substances contained in the mixture leaving second reactor 5;

a vacuum evaporator 8 and a condenser 9 for separating water from the substances contained in the effluent leaving clarifier 7 and for condensing this water, which is very pure.

The apparatus of the invention also includes gravity or pump means shown in schematic form at 10 for transferring the liquid medium contained in premixer 2 to first reactor 3, similar means shown in schematic form at 11 for transferring the mixture leaving first reactor 3 to second reactor 5, similar means shown in schematic form at 12 for transferring the mixture leaving second reactor 5 to clarifier 7, similar means shown in schematic form at 13 for introducing the supernatant liquor in clarifier 7 into an equalizing storage tank 16, similar means 14 for recycling the sludge which accumulates in the bottom of clarifier 7 to premixer 2, similar means shown in schematic form at 15 for feeding the water stored in equalizing storage tank 16 to evaporator 8, and similar means shown in schematic form at 17 for recycling the evaporated and condensed water recovered in a storage tank 19, in which it is regenerated, to premixer 2 and optionally to an external network shown at 18.

In the example shown, means 6 for injecting air comprise a line shown in schematic form at 20 for distributing compressed air and distributors shown in schematic form at 21 for injecting compressed air to the bottom portion of premixer 2, first reactor 3 and second reactor 5. Air injection adds oxygen to the medium in each vessel and stirs the liquor.

It can be seen from FIG. 1 that first reactor 3 is equipped with mixing apparatus which comprises a pump 22 which feeds reaction mixture from reactor 3 to a mixer tank 22*a*, the overflow from which, shown in schematic form at 23, falls back into reactor 3.

Clarifier 7 is any type of clarifier known in itself and does not need to be described in detail here. Clarification occurs by settling, the mixture from second reactor 5 penetrating into clarifier 7 via a tubular axial column 24 and, if necessary, coming into contact with flocculating agents which are introduced in any way (not shown).

The residues recovered from the lower portion of evaporator 8 are sent to a treatment unit 25 in which they are dried and packed for storage, for example, since these residues contain radioactive substances. If necessary, the sludge collected from the bottom of clarifier 7 can also be sent to treatment unit 25.

Storage tank 19 for collecting and regenerating the condensed water is provided with means known in themselves for regenerating this water.

In a preferred embodiment shown in FIG. 2, the treatment apparatus of the invention is mounted on a platform 26 which can be transported on the platform of a truck or trailer. The platform comprises a peripheral lateral wall 27. The ensemble formed by platform 26 and wall 27 constitutes a containment tank 28 which prevents spillage of any radioactive fluid in the event of an accident. Containment tank 28 is itself covered by a substantially sealed enclosure 29 which is kept at a slightly reduced pressure by a ventilating and air filtering system 30 of well known type which does not need to be described here.

FIG. 1 also shows an inlet 31 for the charge of oils and solvents contaminated with radioactive substances and an inlet 32 for micro-organisms in the broad sense, i.e. a mixture of the micro-organisms themselves with nutrients, activators and other normal supplements, oligo-elements and others, all of which are known in themselves.

The process used in the apparatus 1 of the invention for the treatment of oils and solvents contaminated with radioactive substances includes the conventional step of subjecting these oils and solvents to the action of pre-selected micro-organisms in the presence of air and a very large volume of water, relative to the volume of oils and solvents to be treated, these micro-organisms being adapted to destroy organic molecules, in particular to transform them into $CO_2$ and $H_2O$.

In accordance with the invention, this process is characterized in that it further comprises the following steps:

a) preparing a predetermined volume of water having predetermined characteristics of dissolved oxygen concentration, pH and redox potential;

b) adding a predetermined charge of oils and solvents contaminated by radioactive substances to this volume of water, said charge corresponding to a volume of oils and solvents which is a predetermined fraction of the predetermined volume of water;

c) subjecting said charge to the action of micro-organisms at a predetermined temperature and for a predetermined time period;

d) removing at least a portion of the effluent obtained;

e) separating the water from the substances contained in said effluent;

f) recycling or removing said substances which have been separated from said water;

g) regenerating the water from which the substances contained in the effluent have been removed, so that it regains said predetermined characteristics;

h) recycling a portion of the regenerated water;

i) repeating the cycle from step a);

j) removing a volume of water which is substantially equal to the volume of oils and solvents degraded and destroyed.

This process was developed for treating oils and solvents contaminated with radio-elements and produced by mechanical maintenance of plant located in the controlled area of nuclear power stations and other nuclear installations and reactors.

These oils and solvents, which are stored in containers, are radioactive and contaminated in particular with the following long half-life radio-elements: cobalt 58, 60 and 62, manganese 54, silver 110, cesium 134 and 137, zinc 65, niobium 95, and antimony 124 and 125.

The average activity of the contaminated products is in the order of 700 becquerels per liter, with activities varying from container to container from 50 becquerels per liter to 9 000 becquerels per liter.

More than 98% of the oils and solvents is composed of an a polar fraction essentially containing saturated hydrocarbons $C_nH_{2n+2}$, predominantly $nC_{20}$ and $nC_{21}$ alkanes which correspond to branched aliphatic hydrocarbons.

Traces of aromatic compounds are also found, such as:

benzoic acid;

short chain n-alkanes ($C_9$ to $C_{12}$);

arachidic acid $CH_3(CH_2)_{18}COOH$;

carbonyl compounds (ketones);

acyclic hydrocarbons containing double bonds (alkenes).

Oxidation of arachidic acid and n-alkanes, catalyzed by the micro-organisms present in the reactor, can result in gelling of the medium.

The present inventor has succeeded in solving this gelling problem, whereby formation from metabolites can be more rapid than degradation of the same metabolites, by developing a method which can avoid such gelling.

Micro-organisms attack oils and solvents in a degradation reaction with the following simplified general form:

$(CH_2)_n + 3/2\ nO_2 \rightarrow nCO_2 + nH_2O$ + biomass (micro-organisms)

The most important and the most representative mechanism is degradation of alkanes by oxidation of a terminal methyl group. The carbon atom of the terminal methyl group $—CH_3$ is oxidized to a primary alcohol $—CH_2OH$, then to an aldehyde —CHO then to a primary acid —COOH. This acid is then metabolized by β-oxidation either directly or via formation of the diacid (ω-hydroxylation).

This sequence of reactions is known in itself.

For unsaturated aliphatic hydrocarbons, oxidation of the methyl group is considered to be the principal metabolic route. The methyl group oxidation mechanism is not different from the n-alkane oxidation mechanism.

This degradation of hydrocarbon chains causes the appearance of intermediate by-products of several types in the reaction medium, in particular:

diethyleneglycol dibutyl ether $[CH_3(CH_2)_3—OCH_2—CH_2—CH_2]_2O$;

polyethyleneglycol methyl ether $CH_3(OCH_2CH_2)_nOH$ 2,6-ditertiobutyl-4-methyl phenol.

The formation of polyethyleneglycol produces compounds which can be liquid or solid, depending on the number of monomers, and for which the mixture can result in a viscous product which is close to gelling.

The presence of such a gel would prevent any subsequent development and all action of the micro-organisms since oxygen would no longer be able to dissolve in the reaction medium.

In this reaction, the free water produced represents about 80% by weight of the oils and solvents treated if natural evaporation and the addition of water required for seeding and for the viability of the micro-organisms (growth and reproduction) are not taken into account.

The temperature, 30° C. to 35° C., and the pH, 6.5 to 7.5, are as recommended for the growth and action of the micro-organisms.

The micro-organisms are selected from commercially available industrial micro-organisms. For example, they are selected from the "BIO ACTIV 200" range from TBA (TECHNIQUES ET BIOCHIMIE APPLIQUEES). In conventional fashion, these micro-organisms can be fixed on mineral supports and are used conventionally with suitable nutrients and with emulsifying agents.

The micro-organisms used are thus mixtures of known strains which are substantially specialized for attacking specific products. These mixtures are conventionally prepared so as effectively to decompose the principal constituents of the oils and solvents to be degraded and the intermediate decomposition by-products of these constituents, as mentioned above.

Thus in the above 200 series from TBA, the mixture of micro-organisms will comprise strains with the following codes:

201, suitable for treating halogenated and non-halogenated light aliphatic hydrocarbons;

202, suitable for treating simple non-halogenated aromatic compounds;

203, suitable for treating industrial animal and vegetable fats;

206, suitable for treating polychlorobiphenyls and chlorobenzoates;

208, suitable for treating hydrocarbons and non-halogenated petroleum derivatives.

Any other strain suitable for a specific product or by-product can be added, as well as nutrients and oligo-elements, and also, if necessary, mineral supports required for the growth and action of these micro-organisms.

Following the recommendations of the supplier of these micro-organisms, the nutritional balance of the medium must be constantly maintained in a CARBON/NITROGEN/PHOSPHORUS ratio close to 100/5/1.

The concentrations of micro-organisms and nutrient elements in the reaction medium are those which are normal for these substances.

A process will now be described in which a predetermined volume of regenerated water corresponding substantially to the volume of a new charge of oils and solvents contaminated with radioactive substances is removed. This corresponds to a maximum rate of recycling of regenerated condensed water.

It is clearly possible to recycle a lower percentage of regenerated water and to top up with water from a water supply network. This is prohibited under current French regulations, however.

Pre-selected mineral supports are preferably used on which the micro-organisms are fixed and which will fix the radioactive heavy metal ions in the charge by ion exchange.

Mineral supports conventionally comprise the following components:

alumina silicate, in particular potassium alumina silicate;

porous calcium carbonate;

anamorphic alumina silicate;

zeolites.

These mineral supports are prepared and supplied by all micro-organism suppliers.

It is also possible to use micro-organisms without mineral supports, available as solutions.

As indicated above, the mixture from the second reactor is clarified by settling, if necessary adding a flocculating agent which does not interfere with the process, and the sludge obtained is recycled to step c).

The water is then vacuum evaporated from the effluent leaving the clarification process and the water recovered after evaporation and condensation is used for step g).

At the end of the operation, the mineral supports which are charged with radioactive metals are recovered: these metals are enclosed in a completely insoluble amorphous crystal. The metals are therefore trapped, preventing contamination of the environment and facilitating storage of these metals.

In step g), the water from which the substances contained in the effluent have been removed is regenerated so that it regains its initial characteristics, for example the following characteristics:

dissolved oxygen: about 3 mg/l;

pH: between about 6.9 and 7.1;

redox potential: more than −150 mV, preferably positive (up to 70 mV).

Regeneration can be carried out by adding hydrogen peroxide and sodium hydroxide, for example.

It has been found that the quality of the water used for degradation is of vital importance. The degradation of oils and solvents by the micro-organisms used results in diethyleneglycol dibutyl ether type by-products and polyethyleneglycol methyl ether type compounds.

If due care is not taken, the concentration of these by-products in the reaction medium can only increase, resulting in true polymerization which leads to gelling of the medium in the reactor, preventing any subsequent growth of the micro-organisms.

If the above conditions are adhered to, the by-products mentioned are decomposed more rapidly than they are formed, and degradation of the hydrocarbons and organic substances can continue without substantial problems, following the reaction cited above.

Under these conditions, only small quantities of waste products are produced. These waste products comprise the two by-products cited above and polyethyleneglycol. The proportion of these waste products is in the order of 3 per thousand by weight: this means that about 3 kg of final waste will be recovered for about 1000 kg of oils or solvents degraded.

The above process can be carried out continuously or discontinuously. It can continuously treat effluent which represents about 20 times the volume of oils to be degraded and water can be sent back to the premixer having the same characteristics as the starting water provided by a public water supply network, i.e.:

chemical oxygen demand (COD) of less than 125 mg/l;

neutral pH;

slightly positive redox potential of about 70 mV to 80 mV;

hydrocarbon number<10 mg/l;

metals<15 mg/l.

A process and apparatus for completely environmentally safe treatment of oils and solvents has thus been described, the latter being decomposed to essentially $CO_2$ and $H_2O$, only perfectly inert gases, namely $CO_2$ and $H_2O$, being discharged into the atmosphere and only regenerated water which satisfies the current regulations being sent to the water collection or supply network.

In particular, the apparatus of the invention, which is in the form of an installation mounted on at least one road-transportable platform, can be readily moved from one site to another to treat contaminated oils and solvents at each site and decompose them to essentially $CO_2$ and $H_2O$, with a very small quantity of waste containing radioactive substances, of the order of 3 per thousand by weight of treated oils and solvents. This apparatus has the additional advantage of eliminating the need for transporting radioactive oils and solvents to a treatment site for such oils and solvents.

Figure 3:
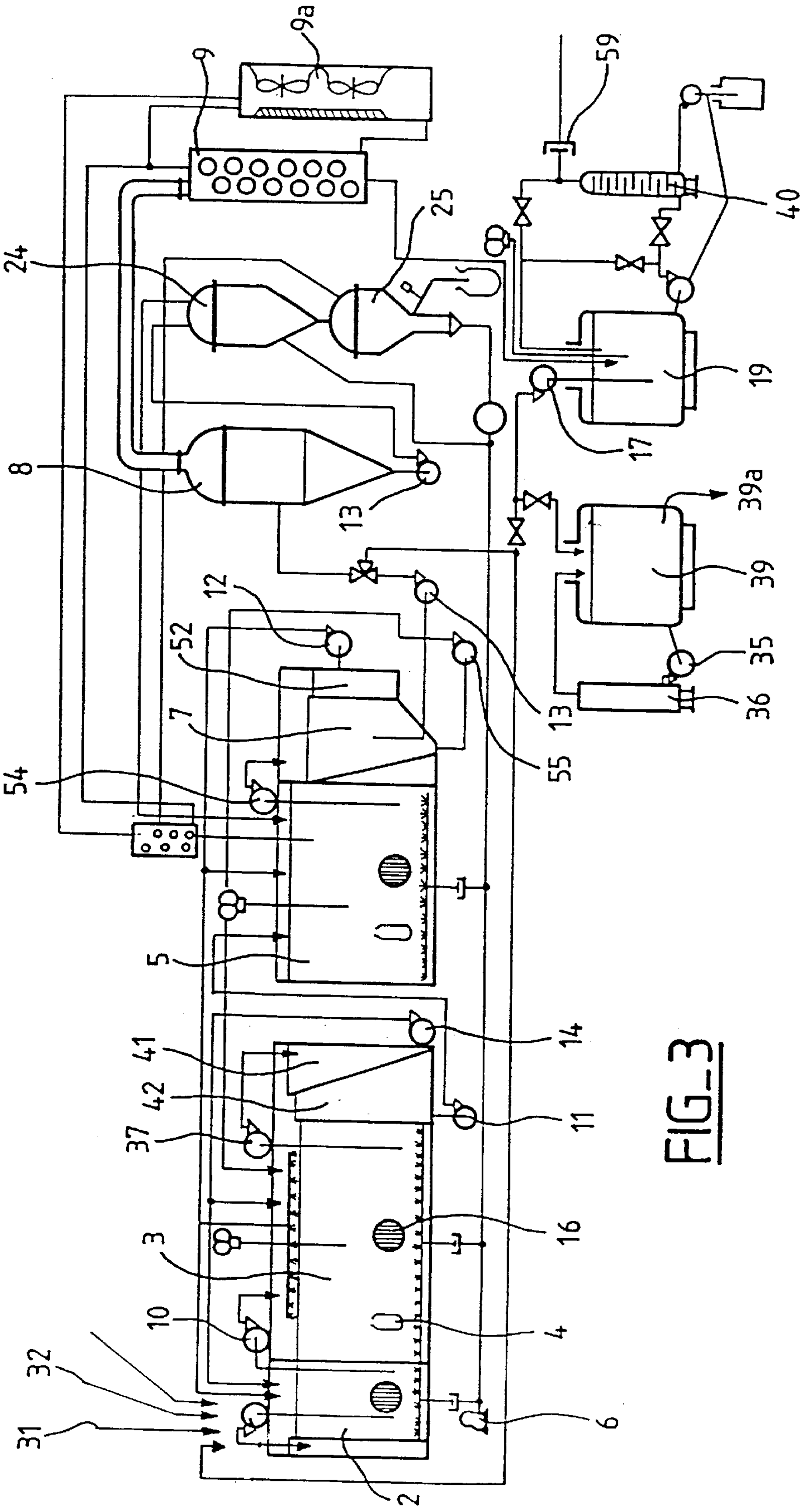
FIG. 3 is a view similar to FIG. 1 of another embodiment of the apparatus of the invention.

In the embodiment of FIG. 3, devices which are the same as those of FIG. 1 have been given the same reference number.

The mixture resulting from biodegradation in reactor 3 is transferred via pump 37 to a primary settler 41 at a flowrate which is much higher that the nominal flowrate of the installation.

The biomass recovered from the bottom of primary settler 41 is returned to premixer 2 via pump 14.

The supernatant liquor and a portion of the excess volume overflow into secondary settler 42 then overflow back into reactor 3.

The mixture, which has had the major portion of suspended substances and incompletely degraded fatty substances removed in this way is transferred to reactor 5 by pump 11. The COD at this time is in the order of 40 000 ppm.

The mixture transferred in this way to reactor 5 is subjected to the action of new micro-organisms which destroy fatty acids. This drops the COD to a level close to 300 ppm.

The mixture treated in reactor 5 is sent to clarifier 7 by pump 54 at a flowrate which is slightly above the nominal flowrate so that the last fatty elements which may have escaped the action of the micro-organisms overflow into a recovery tank 52 from which they are taken by pump 12 and sent to premixer 2.

The small quantity of flocculated sludge-which may be deposited on the bottom of clarifier 7 is taken up by pump 55 and returned to reactor 3.

The clarified water contains a few miscible products, by-products of biodegradation such as diethyleneglycol dibutyl ether, polyethyleneglycol methyl ether and ditertiobutyl-4-methyl phenol, plus carbon chain residues ($C_{11}$ to $C_{21}$ alkanes), and is sent to vacuum evaporator 8.

The demineralized water produced by condenser 9 of evaporator 8 is sent to tank 19 where a system 40 regenerates its redox potential with hydrogen peroxide, regenerates its pH with sodium hydroxide and aerates it by forced recirculation through a microporous atomizer. This reconstituted water with the characteristics of industrial water is sent to premixer 2 where it contributes to a new degradation cycle. Such treatment is known in itself. Condenser 9 is associated with a conventional refrigeration unit 9*a*.

The final waste recovered from the bottom of evaporator 8 is sent to a buffer tank 24, the volume of which corresponds to three days' operation of the installation. The product is homogenized by addition of water and air and then sent under pressure through the atomizer of fluidized bed drying means 25.

Every day, a quantity of water regenerated in tank 19 corresponding to the quantity of degraded oil is removed during its transfer from tank 19 to premixer 2. This water is stored in tank 39 from which it is fed by pump 35 into an activated charcoal filter 36 for purifying it. This water, the characteristics of which satisfy the current regulations, is discharged into the environment at 39*a* at the end of the operation.

The activated charcoal filter removes practically all of the last organic compounds (COD) contained in this regenerated condensed water.

Figure 4:
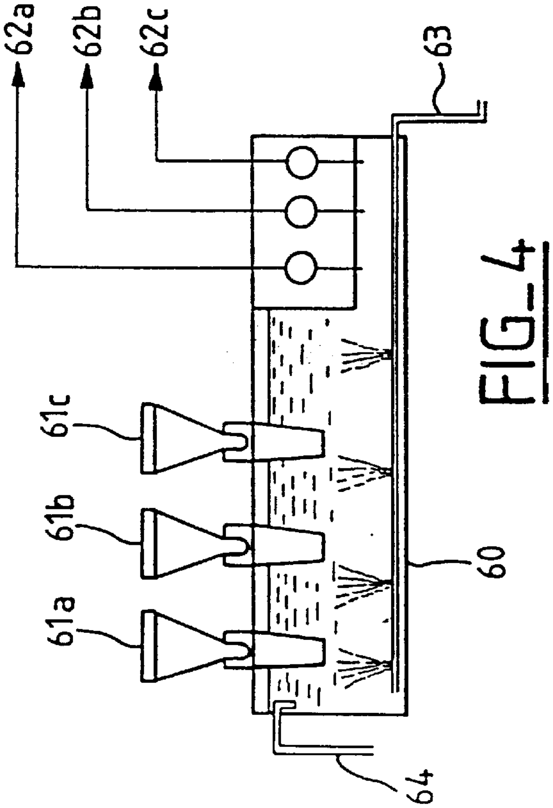
FIG. 4 is a schematic side view of an apparatus for reactivating and developing micro-organisms.

In the embodiment of FIG. 4, a storage tank 60 reactivates and grows the micro-organisms and the nutrients are supplied via three measuring devices 61*a*, 61*b*, 61*c*. Three variable flow outlets 62*a*, 62*b*, 62*c* supply premixer 2 and reactors 3 and 5 with micro-organisms. An air or oxygen supply 63 is provided.

The water removed from premixer 2 arrives at 64. It is kept at a temperature of 35° C. by a circulating fluid heater so that micro-organisms never enter the circulating fluid heater, the internal temperature of which would be fatal to them.

A program well defined in terms of time and quantity to suit the capacity of the installation ensures that the distributor with three compartments 61*a*, 61*b*, 61*c* supplies micro-organisms, oligo-elements and nutrients to storage tank 60.

The micro-organisms revive and then grow to constitute a biomass with a composition thousands of times higher than that found in the installation, thus increasing the rate of degradation of the carbon chains and the resulting COD. This preparation process can increase the capacity of the treatment unit by a factor which is in the order of 50%.

Aeration can be replaced by bubbling or micro-bubbling using microporous plugs mounted on distributors 21 or by hydro-ejectors 66 with the following three functions:

- maintaining a suitable $O_2$ concentration in the medium (2.5 mg/l to 3 mg/l of water);
- preventing the formation of foam and blocking of orifices;
- maintaining the stability of the redox potential at a suitable positive voltage of the order of about 70 mV.

Figure 5:
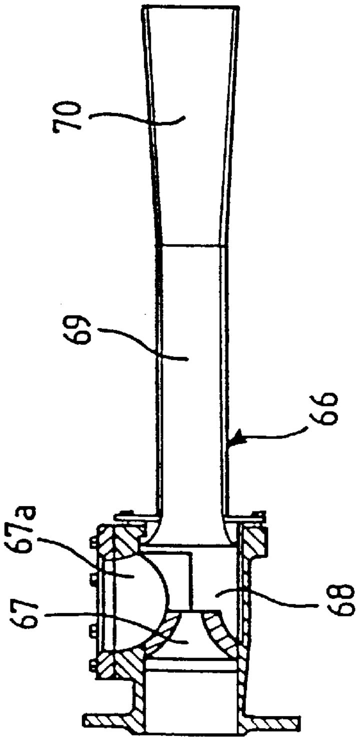
FIG. 5 is a schematic sectional view of a water ejector.

Hydro-ejector 66 shown in FIG. 5, having a conventional structure, includes a centrifugal pump (not shown) supplying a central calibrated nozzle 67 located on the an axis of an annular chamber 68, an air/water mixing tube 69 and a diffuser 70. It is completed by an atmospheric air supply tube, an oxymeter and a valve for regulating the supply of water (not shown).

It operates as follows:

- the flow of water from the pump is directed towards hydro-ejector 66 and enters the body of the ejector via nozzle 67;
- at this point, the flowrate is increased to create a very large pressure drop;
- using intake tube 67*a*, air is fed into draft chamber 68 at a rate which is sufficient for mixing it with the water sent into mixer tube 69;
- diffuser 70 reinforces this effect by slowing down the flow of the water/air combination;
- the water pump is supplied via an overflow so that it draws water from slightly below the surface and therefore draws off any foam which may have formed on the surface and fatty substances and feeds them to the bottom of the reactor to stir the bath continuously;
- the oxymeter fixes the air intake flowrate to keep the $O_2$ content of the medium stable.

Drying the final waste, the radioactivity of which can reach 10 000 becquerels, is achieved by fluidization in a static drier 71 which contains no mechanical parts which could be impossible to decontaminate at the end of the operation.

Figure 6:
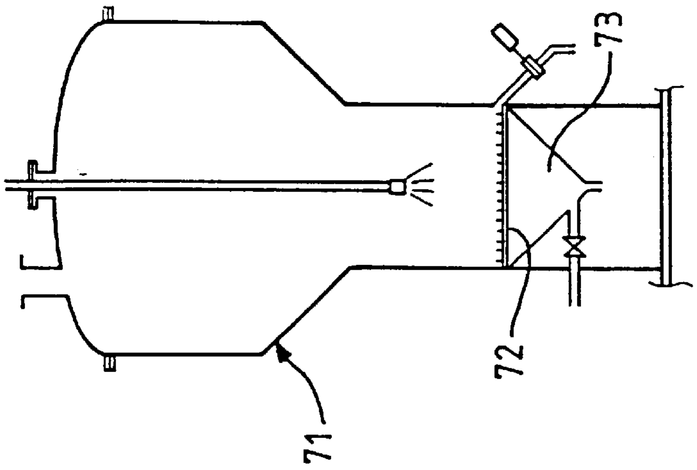
FIG. 6 is, a schematic sectional view of a fluidized bed drier.

In conventional fashion, the apparatus comprises (see FIG. 6):

- drier 71 proper, comprising a cylindrical body closed at its base by a perforated baseplate in which nozzles are installed for homogeneous distribution of the air required for drying;
- under baseplate 72, a conical air chamber 73 having an inlet for hot air at 250° C. which passes through the nozzles to dry the product;
- above the cylindrical body in which the product is dried, a truncated inverted cone connected to a cylindrical barrel with a diameter twice that of the drying compartment, so that very small dried particles are prevented from escaping, considerably reducing the speed of the air-vapor gas mixture;
- a rounded top closing the upper part of the expansion compartment and forming the roof of the drier, with orifices provided with collars and flanges respectively for evacuating gases and for mounting an injection pipe for the product to be dried;
- a blower supplying the necessary airflow which arrives in the air chamber of the drier after being heated to 250° C. in a circulating fluid heater;
- pressure gauges and temperature sensors installed in the air chamber in the drying compartment and in the freeboard.

Of course, the present invention is not limited to the embodiment which has been described and a number of changes and modifications can be made thereto without departing from the scope of the invention.

Thus micro-organisms of various origins could be used or the clarifier or vacuum evaporator could be replaced by equivalent systems.

Further, in a manner that is known in itself, a powerful oxygenating agent such as hydrogen peroxide could be added to the reactor.

What I claim is:

1. A process for treating oils and solvents contaminated by radioactive substances, including a step of subjecting said oils and solvents to the action of preselected micro-organisms in the presence of nutrients, air and a very large volume of water, relative to the volume of oils and solvents to be treated, said micro-organisms being adapted to destroy organic molecules, and in particular to transform them into $CO_2$ and $H_2O$, which process further includes the following steps:

a) providing a predetermined volume of water having predetermined characteristics of dissolved oxygen concentration, pH and redox potential;

b) adding a predetermined charge of oils and solvents contaminated by radioactive substances to this volume of water, said charge corresponding to a volume of oils and solvents contaminated by radioactive substances to this volume of water, said charge corresponding to a volume of oils and solvents which is a predetermined fraction of the predetermined volume of water, c) subjecting said charge to the action of micro-organisms at a predetennined temperature and for a predetermined time period;

d) removing at least a portion of an effluent obtained;

e) separating the water from substantially all substances contained in said effluent, by evaporating and condensing said water and recovering said water after evaporation and condensation;

f) performing a function on said substances which have been separated from said water, in said effluent portion wherein said function is selected from a group of functions consisting of recycling said substances and removing said substances;

g) regenerating said water, recovered in step e, so that it regains said predetermined characteristics;

h) recycling at least one portion of said regenerated water and adding a volume of water to said regenerated water necessary to restore said predetermined volume of water;

i) repeating the cycle from step b).

2. A process as claimed in claim 1 wherein a predetermined volume of regenerated water substantially corresponding to the volume of a new charge of oils and solvents contaminated with radioactive substances is recycled in step h).

3. A process as claimed in claim 1 wherein said charge contains some metals and pre-selected mineral supports are used for said micro-organisms to fix at least a portion of the metals present in said charge by ion exchange.

4. The process as claimed in claim 3 wherein said mineral supports include alumina silicate, zeolites or calcium carbonate.

5. A process as claimed in claim 3 wherein at the end of said ion exchange said mineral supports, which are charged with radioactive metals, are recovered.

6. A process as claimed in claim 1 wherein said evaporation step is a vacuum evaporation step.

7. The process claimed in claim 1 wherein residues from said evaporation are recovered and dried in a fluidized bed.

8. A process as claimed in claim 1 wherein said effluent of step d) is clarified by settling and the sludge obtained is recycled to step c).

9. A process as claimed in claim 1 wherein said micro-organisms and nutrient elements required for them are introduced into water having a predetermined temperature and characteristics so as to reactivate and grow said micro-organisms in said water and the water in which said micro-organisms are grown is introduced into step c).

10. A process as claimed in claim 1 wherein in step g) water from which said substances contained in said effluent have been removed is regenerated so as to regain the following characteristics:

dissolved oxygen: about 3 mg/l;

pH: between about 6.9 and 7.1;

redox potential: more than −150 mV.

11. An apparatus for treating oils and solvents contaminated by radioactive substances comprising:

storage tank for receiving and containing a predetermined volume of water having predetermined characteristics of dissolved oxygen concentration, pH and redox potential;

means for adding a predetermined charge of oils and solvents contaminated by radioactive substances to this volume of water, said charge corresponding to a volume of oils and solvents which is predetermined fraction of the predetermined volume of water;

means for injecting air into said storage tank;

means for subjecting said charge in said storage tank to the action of micro-organisms at a predetermined temperature and for a predetermined time period, said micro-organisms being adapted in the presence of nutrients, air and a very large volume of water to destroy organic molecules, and in particular to transform them into $CO_2$ and $H_2O$;

means for removing at least a portion of substantially all substances contained in said effluent comprising means for evaporating and condensing said water and means for recovering said water after evaporation and condensation;

means for performing a function on said substances contained in said effluent portion, wherein said function is selected from a group of functions consisting of recycling said substances and removing said substances;

a second storage tank for regenerating said recovered water so that it regains said predetermined characteristics; and means for recycling at least a portion of said regenerated water.

12. The apparatus claimed in claim 11 wherein said means for removing said substances contained in said effluent comprise means for clarifying said effluent by flocculation.

13. An apparatus as claimed in claim 11 wherein said evaporating means comprise including means for vacuum evaporating water from said effluent.

14. An apparatus as claimed in claim 11 wherein said means for adding a predetermined charge includes a premixer adapted to receive a predetermined volume of water, a predetermined charge of contaminated oils and solvents and micro-organisms;

a first reactor adapted to receive at least a portion of the mixture from said premixer and micro-organisms;

said means for subjecting said charge in said storage tank to the action of micro-organisms includes a second reactor adapted to receive the mixture leaving said first reactor;

means for injecting air into said premixer and into each of said reactors; and a clarifier for separating the substances contained in the mixture leaving said second reactor said means for removing includes an evaporator and a condenser for recovering water from the effluent leaving said clarifier.

15. An apparatus as claimed in claim 11 wherein said means for performing a function includes means for drying said substances from said water using a fluidized bed.

16. An apparatus as claimed in claim 11 all components of which are mounted in a containment tank.

17. The apparatus claimed in claim 16 wherein said containment tank is covered with an enclosure which is substantially sealed and adapted to be maintained at a slightly reduced pressure by a system for ventilating and filtering the extracted air.

* * * * *